(12) United States Patent
Astrachan

(10) Patent No.: US 11,386,504 B2
(45) Date of Patent: Jul. 12, 2022

(54) TAX-IMPLICATION PAYOFF ANALYSIS

(71) Applicant: HRB Innovations, Inc., Las Vegas, NV (US)

(72) Inventor: Sandee Astrachan, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 255 days.

(21) Appl. No.: 15/785,771

(22) Filed: Oct. 17, 2017

(65) Prior Publication Data

US 2019/0114721 A1     Apr. 18, 2019

(51) Int. Cl.
*G06Q 40/00*        (2012.01)

(52) U.S. Cl.
CPC .................................. *G06Q 40/123* (2013.12)

(58) Field of Classification Search
CPC ..................................................... G06Q 40/123
See application file for complete search history.

(56) References Cited

U.S. PATENT DOCUMENTS

| | | | | |
|---|---|---|---|---|
| 5,675,636 A * | 10/1997 | Gray | ...................... | H04M 15/00 379/114.15 |
| 7,693,769 B1 * | 4/2010 | Burlison | ................ | G06Q 40/02 705/36 R |
| 7,860,763 B1 * | 12/2010 | Quinn | .................... | G06F 17/243 705/31 |
| 8,442,882 B1 * | 5/2013 | Ferguson | ......... | G06Q 10/06311 705/31 |
| 8,620,712 B1 * | 12/2013 | Mori | .................. | G06Q 10/1095 705/7.19 |
| 10,140,666 B1 * | 11/2018 | Wang | .................... | G06Q 40/123 |
| 10,460,398 B1 * | 10/2019 | Gielow | ................ | G06Q 40/123 |
| 2005/0236184 A1 * | 10/2005 | Veeningen | .............. | E21B 10/00 175/40 |
| 2007/0203858 A1 * | 8/2007 | Olsen | ................. | G06Q 30/0283 705/400 |
| 2008/0071703 A1 * | 3/2008 | Evans | .................... | G06Q 40/10 705/31 |

(Continued)

FOREIGN PATENT DOCUMENTS

CA           2732569 A1 *   4/2012    ............. G06F 21/31

OTHER PUBLICATIONS

1040A Instructions, Internal Revenue Service, 2016, pp. 1-90 (Year: 2016).*

*Primary Examiner* — David P Sharvin
*Assistant Examiner* — Gregory Harper
(74) *Attorney, Agent, or Firm* — Erise IP, P.A.

(57) ABSTRACT

Tax payoffs are determined for potential income source exclusions, for potential tax deductions, for potential tax credits, and for other tax implications. Identifying the tax payoff may be based at least in part on the likeliness that the tax implication will apply to the taxpayer's situation, the expected monetary impact on the taxpayer's tax burden if it does apply, and the expected effort required to claim the tax implication. Based upon the tax payoffs, embodiments of the invention may then recommend potential tax implications, prioritize potential tax implications, eliminate potential tax implications from consideration, or take other actions to assist the taxpayer in efficiently and effectively prepare their tax return.

17 Claims, 4 Drawing Sheets

(56) References Cited

U.S. PATENT DOCUMENTS

| | | | |
|---|---|---|---|
| 2008/0189197 A1* | 8/2008 | Allanson | G06Q 40/02 705/31 |
| 2009/0105947 A1* | 4/2009 | Nachesa | G01C 21/343 701/533 |
| 2011/0145034 A1* | 6/2011 | Moore | G06Q 10/00 705/7.17 |
| 2011/0202361 A1* | 8/2011 | Firminger | G16H 20/30 705/2 |
| 2012/0179482 A1* | 7/2012 | Garms | G16H 20/30 705/2 |
| 2014/0304019 A1* | 10/2014 | Scott | G06Q 10/0633 705/7.15 |
| 2014/0343986 A1* | 11/2014 | Sinha | G06Q 10/063114 705/7.15 |
| 2015/0066568 A1* | 3/2015 | Rees | G06Q 10/06315 705/7.25 |
| 2015/0262111 A1* | 9/2015 | Yu | G06Q 50/01 705/7.14 |
| 2016/0092994 A1* | 3/2016 | Roebuck | G06Q 40/123 705/31 |
| 2016/0180279 A1* | 6/2016 | Koerner | G06Q 50/01 705/7.15 |
| 2016/0247239 A1* | 8/2016 | Houseworth | G06Q 40/123 |
| 2016/0350870 A1* | 12/2016 | Morin | G06N 20/00 |
| 2017/0004583 A1* | 1/2017 | Wang | G06Q 40/123 |
| 2017/0004584 A1* | 1/2017 | Wang | G06Q 40/123 |
| 2017/0220979 A1* | 8/2017 | Vaananen | G05D 1/104 |
| 2017/0243143 A1* | 8/2017 | Engstrom | G06Q 10/0633 |
| 2017/0308960 A1* | 10/2017 | Mascaro | G06N 20/20 |
| 2018/0150913 A1* | 5/2018 | Wang | H04L 67/306 |
| 2019/0000401 A1* | 1/2019 | Schonenberg | A61B 5/7267 |

\* cited by examiner

TAX-IMPLICATION PAYOFF ANALYSIS

BACKGROUND

1. Field

Embodiments of the invention relate to tax implications and the preparation of tax returns.

2. Related Art

Various tax codes are long and complicated. Numerous income source exclusions, tax deductions, tax credits, and other tax implications can be reported by the taxpayer to affect the taxpayer's tax liability. These tax implications are reported on a tax return. As such, the preparation of a tax return can be a time-consuming and complicated process. There are numerous tax implications that would have little payoff to a taxpayer. Payoff, as used herein, is a measure of an amount and likelihood of benefit compared to the time and effort required to achieve that benefit. Nonetheless, the taxpayer will still expend substantial time and effort in reporting all these optional tax implications, even for little or no payoff. This is because there is no system in the prior art that can inform the taxpayer of which tax implications are likely to have the highest payoff. A taxpayer could not manually perform this payoff analysis because such analysis would be more time and effort intensive than claiming the tax implication in the first place. Thus, taxpayers currently are preparing tax returns and performing work to claim all tax implications (which is inefficient), performing work to claim tax implications until becoming frustrated (which leaves potentially high-payoff implications unreported), or estimating the highest payoff tax implications and performing work to claim those tax implications (which is prone to error by the taxpayer). What is lacking in the prior art is a system to assist the taxpayer in knowing the high payoff tax implications before or during the tax return preparation process.

SUMMARY

Embodiments of the invention solve the above-mentioned problems by providing a system, a computerized method, and a computer program for identifying tax payoffs based upon potential income source exclusions, tax deductions, tax credits, and other tax implications. Identifying the tax payoff may be based at least in part on the likeliness that the tax implication will apply to the taxpayer's situation, the expected monetary impact on the taxpayer's tax burden, and the expected effort required to claim the tax implication. Based upon the tax payoffs, embodiments of the invention may then recommend potential tax implications, prioritize potential tax implications, eliminate potential tax implications from consideration, or take other actions to assist the taxpayer in efficiently and effectively prepare their tax return.

A first embodiment of the invention is directed to a non-transitory computer readable storage medium having a computer program stored thereon for identifying tax payoffs, wherein execution of the computer program by at least one processing element performs the following steps: acquiring a set of tax information related to a taxpayer; determining a first possible tax implication for the taxpayer based at least in part on the set of tax information; determining a second possible tax implication for the taxpayer based at least in part on the set of tax information; calculate, for the first possible tax implication, a first estimated monetary impact and a first estimated effort level; calculate, based upon the first estimated monetary impact and the first estimated effort level, a first tax payoff; calculate, for the second possible tax implication, a second estimated monetary impact and a second estimated effort level; calculate, based upon the second estimated monetary impact and the second estimated effort level, a second tax payoff; compare the first tax payoff to the second tax payoff; and present, to the user, a recommendation based upon said comparison of the first tax payoff and the second tax payoff that the taxpayer claim the first tax implication.

A second embodiment of the invention is directed to a computerized method of for identifying tax payoffs, the method comprising the following steps: acquiring a set of tax information related to a taxpayer; determining a first possible tax implication for the taxpayer based at least in part on the set of tax information; determining a second possible tax implication for the taxpayer based at least in part on the set of tax information; calculate, for the first possible tax implication, a first estimated monetary impact and a first estimated effort level; calculate, based upon the first estimated monetary impact and the first estimated effort level, a first tax payoff; calculate, for the second possible tax implication, a second estimated monetary impact and a second estimated effort level; calculate, based upon the second estimated monetary impact and the second estimated effort level, a second tax payoff; and present, to the user, information indicative of the first tax payoff.

A third embodiment of the invention is directed to a computerized method of for identifying tax payoffs, the method comprising the following steps: acquiring a set of tax information related to a taxpayer; determining a first possible tax implication for the taxpayer based at least in part on the set of tax information; determining a second possible tax implication for the taxpayer based at least in part on the set of tax information; access a tax return data store that includes a set of comparative information related to at least one other tax return; calculate, for the first possible tax implication and based at least in part on the set of comparative information, a first estimated monetary impact and a first estimated effort level; calculate, based upon the first estimated monetary impact and the first estimated effort level, a first tax payoff; calculate, for the second possible tax implication and based at least in part on the set of comparative information, a second estimated monetary impact and a second estimated effort level; calculate, based upon the second estimated monetary impact and the second estimated effort level, a second tax payoff; and present, to the user, information indicative of the first tax payoff.

Still other embodiments of the invention may be directed to a computerized method of implementing the above-discussed steps. Still other embodiments of the invention may be directed to a system that comprises a server and a user device. The server is configured to receive information from the user device indicative of at least one tax information and then perform the discussed steps to determine tax payoffs.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
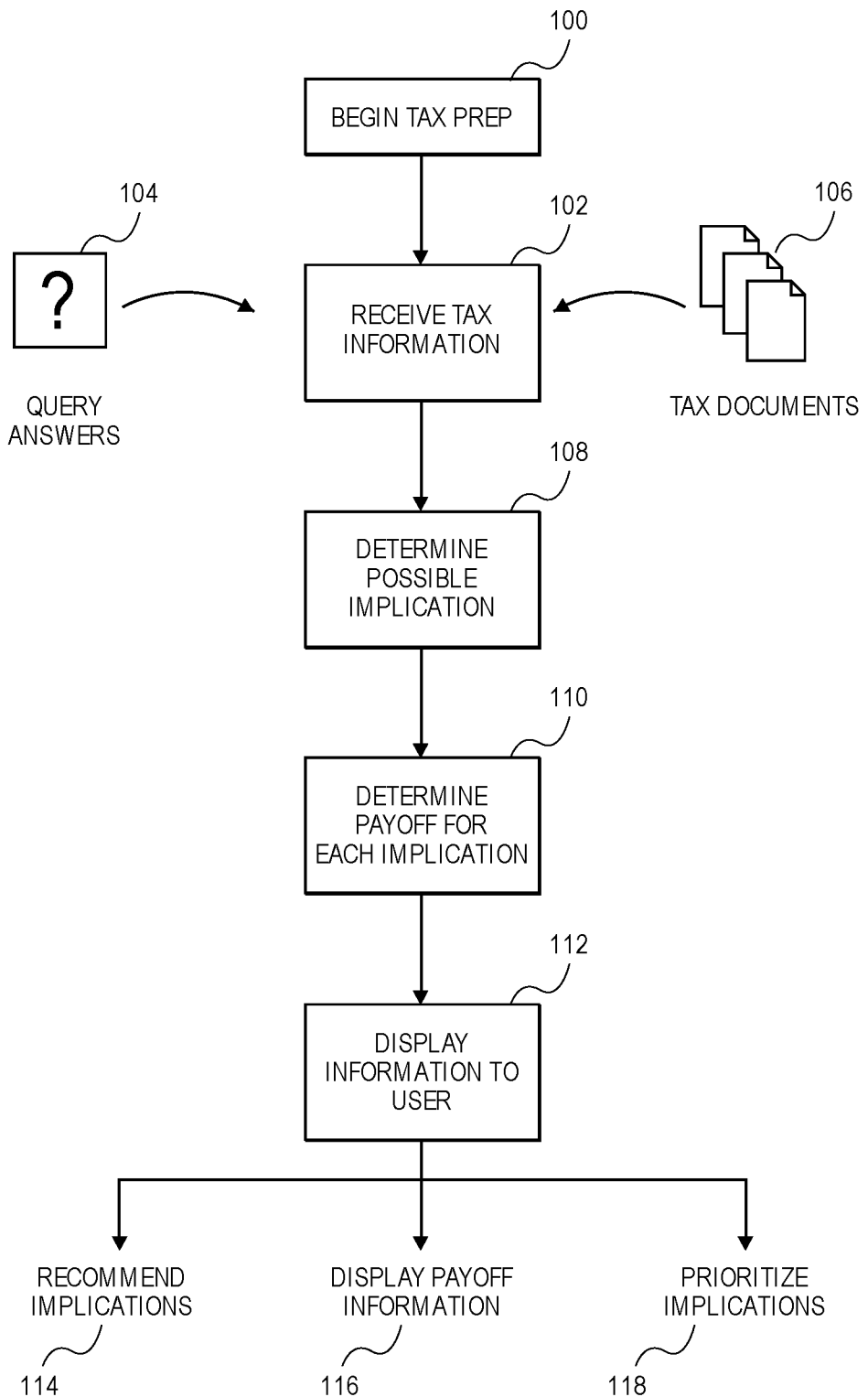
FIG. 1 is a flow diagram of an exemplary embodiment of the invention that assist in preparing a tax return for the user.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a system, a computerized method, and a computer program for identifying tax payoffs based upon potential income sources, tax deductions, tax credits, and other tax implications. Identifying the tax payoff may be based at least in part on the likeliness that the tax implication will apply to the taxpayer's situation, the expected monetary impact on the taxpayer's tax burden, and the expected effort required to claim the tax implication. Based upon the tax payoffs, embodiments of the invention may then recommend potential tax implications, prioritize potential tax implications, eliminate potential tax implications from consideration, or take other actions to assist the taxpayer in efficiently and effectively prepare their tax return.

Turning to the figures, FIG. 1 presents an exemplary flow diagram illustrating various steps of embodiments of the invention. Generally, a tax return preparation process is performed. During the process, tax information is gathered by user answers to queries and provided tax documents. Based at least in part upon the tax information (which may be a partially provided), embodiments of the invention determines possible tax implications that may be able to be claimed by the taxpayer. These tax implications could be deductions, credits, incomes, benefits, tax programs, and other items that are potentially impactful on the taxpayer's tax liability. Because there are numerous tax implications possible based upon the tax code and other origins, embodiments of the invention analyze all or some of these potential implications for a payoff. Payoff, as used herein, is a measure of an amount and likelihood of benefit compared to the time and effort required to achieve that benefit. Information related to the payoff may be displayed to the user, such as a recommendation In Step 100, the tax preparation process is begun. It should be appreciated that some embodiments of the invention are a tax return preparation program (such as an at-home tax preparation program or a professional tax preparation program). Other embodiments may be ancillary or secondary functions associated with a tax preparation program. In Step 100, a set of taxpayer information may additionally or alternatively be received. The set of taxpayer information may include additional known information about the taxpayer, such as account information, previous year tax returns, qualitative information, quantitative information, or other information known about the taxpayer.

It should be appreciated that in embodiments of the invention, the discussed steps may be performed before or during completion of the tax return, upon the user reaching a certain step in the completion of the tax return, upon specific request of the user, as a premium feature available to the user, upon a user returning to restart the tax preparation program, upon a user providing an indication of completion of the tax return, or at another time. For example, the below discussed steps may be performed while the taxpayer or other user is providing information to a tax return preparation program. As a more specific example, upon the input of income information, the steps discussed below may be begun before presenting the user with deduction and credit information. The steps may be performed periodically such that the steps may be performed more than once during the preparation of the tax return. Successive iterations of the below-discussed steps may include updated and additional information that is received later from the user.

The taxpayer may include any entity, either a legal or natural person, that files a tax return with a government taxing authority. The taxpayer may also be a married couple or other plurality of individuals filing a single tax return. Taxes to be paid can be United States Federal Income Tax, income tax for the various states within the United States, corporate taxes, partnership taxes, LLC taxes, property taxes, tariffs, or other taxes. Typically, the taxpayer provides information relevant to themselves and the amount of tax owed in the form of the tax return (based upon incomes, expenses, and the like). The tax return may therefore include information indicative of the employer and other external entities to which the taxpayer is or may be associated. The tax return may also include information indicative of various benefits that the taxpayer is utilizing (or has utilized during the tax year).

In Step 102, the computer program receives information about the taxpayer. This can include, in Step 104, presenting queries to the user and receiving answers thereto. For example, the user may be presented with various questions that may have potential tax implications. This can also include, in Step 106, receiving tax documents (or information indicative of tax documents). In one embodiment, the taxpayer brings physical copies of his tax-related documents, such as W2s and 1099s, to the tax preparer. A tax preparer then enters information from the tax-related documents into a tax preparation computer program. In another embodiment, the taxpayer enters information from the tax-related documents into tax preparation software. The tax preparation computer program may be the same as or interface with the computer program of embodiments of the invention. In addition, the taxpayer answers questions related to his taxes, either verbally to the tax preparer or by inputting into the computer program.

The tax return is essentially a report filed with the appropriate government taxing authority, such as the Internal Revenue Service in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax preparer calculates the taxes due. To assist in the calculation and to allow the taxing authority to verify the calculations, the tax return contains pertinent information associated with the taxpayer for the tax year. The tax return can be either written, digital, or a combination of both. In other embodiments, information relevant to the taxpayer and the tax to be paid are provided on other various forms and documents, such as a Form W2 or a Form 1099.

In embodiments of the invention, the system may also receive or otherwise acquire tax returns from previous years and/or relevant to other taxing authorities for the current and/or previous years, financial records, and bank statements. In some embodiments, all of the information is received by the computer program as a single set. In other embodiments, the computer program may query the user to input additional information. The taxpayer may also provide information to the system that the tax preparer does not have access to, such as financial records and bank statements.

In Step 108, possible implications are determined. Implications are programs, code sections, benefits, and other aspects of the tax code that change a tax liability for the taxpayer. Implications may also originate in regulations, rulings, administrative agencies, and entitlement programs. For example, implications may include income sources, tax deductions, and tax credits. More specific examples of deductions include trade and business deductions, losses from sale or exchange of property, deductions from rents and royalties, pensions and annuities, retirement savings, alimony, moving expenses, interest on educational loans, higher education expenses, health savings accounts, startup expenses, expenses for determining tax owed, management of rental properties, charitable donations, medical care, various types of interest, depreciation, creation of a corporation, losses in a business or trade, business meals, entertainment related to business, trade and business education, state and local taxes. More specific examples of tax credits include taxes withheld, earned income tax credit (both of which are refundable credits), dependent care credits, child credits, Individual Retirement Account (IRA) contributions, and education expenses such as the Hope Scholarship and the Lifetime Learning Credit. Other implications may also be allowed by law, regulation, rulings, or other origin.

In Step 110, payoffs are determined for each of the implications and/or the implications collectively. The payoff is, in embodiments of the invention, a measure of how much the taxpayer should claim the implication. For example, if a certain implication requires detailed documentation which must be located, lengthy work to provide justification, and little to no monetary impact for the efforts, this certain implication may be said to have a low payoff. If, for a counter example, another implication requires no additional documentation, requires very little work by the taxpayer to claim, and will potentially include a high monetary impact, this other implication may be said to have a high payoff. The payoff may therefore be based upon any of numerous factors, such as likeliness that the implication will apply to the taxpayer, an expected monetary impact if the implication does apply, and an amount of work necessary for the taxpayer to claim the implication. The steps performed in determining the payoff are discussed in much more detail below.

In Step 112, various information related to the above analysis is displayed to the user. Displaying information to the user allows the user to make an informed decision on which, if any, of the implications to pursue, and in what order to pursue them. This can reduce the overall time and frustration experienced by the user in preparing a tax return. The information allows for the user to make this informed decision by performing operations in the background that the user would not be able to perform, and even if the user could, would be time and effort prohibitive to calculate.

The various information displayed to the user may include, in Step 114, recommended implications for the user to pursue. The various information may additionally or alternatively include, in Step 116, payoff information about the calculated payoff (discussed in more depth below). The various information may additionally or alternatively include, in Step 118, prioritizing the implications. The various information may additionally or alternatively include a recommendation not to pursue certain implications (such as if the likelihood of application is below a certain threshold, as discussed below).

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software or as a pay service.

In embodiments of the invention, the invention is utilized by a tax professional. In these embodiments that are used by the tax professional, the tax professional may use the service in conjunction with preparation and filing of the tax return. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help the client in preparing the tax return by an external system.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a taxing authority. The taxing authority (also known as a revenue service or revenue agency) is a government entity or an entity associated with a government body. The taxing authority has, through prescribed legal authority, the power to assess, levy, and collect taxes. The taxing authority may also have the power to collect other non-tax-related revenue, such as penalties and interest. The taxing authority may perform secondary functions, such as investigating and charging tax fraud, performing audits, etc. The taxing authority can be at any level of government: international, federal, state, county, and city. Examples of taxing authorities include the IRS, the Missouri Department of Revenue, etc. The taxing authority may be motivated to utilize the invention to provide a benefit that could only be available in electronic form, thereby encouraging electronic filing which is easier and cheaper to receive than paper tax returns.

Figure 2:
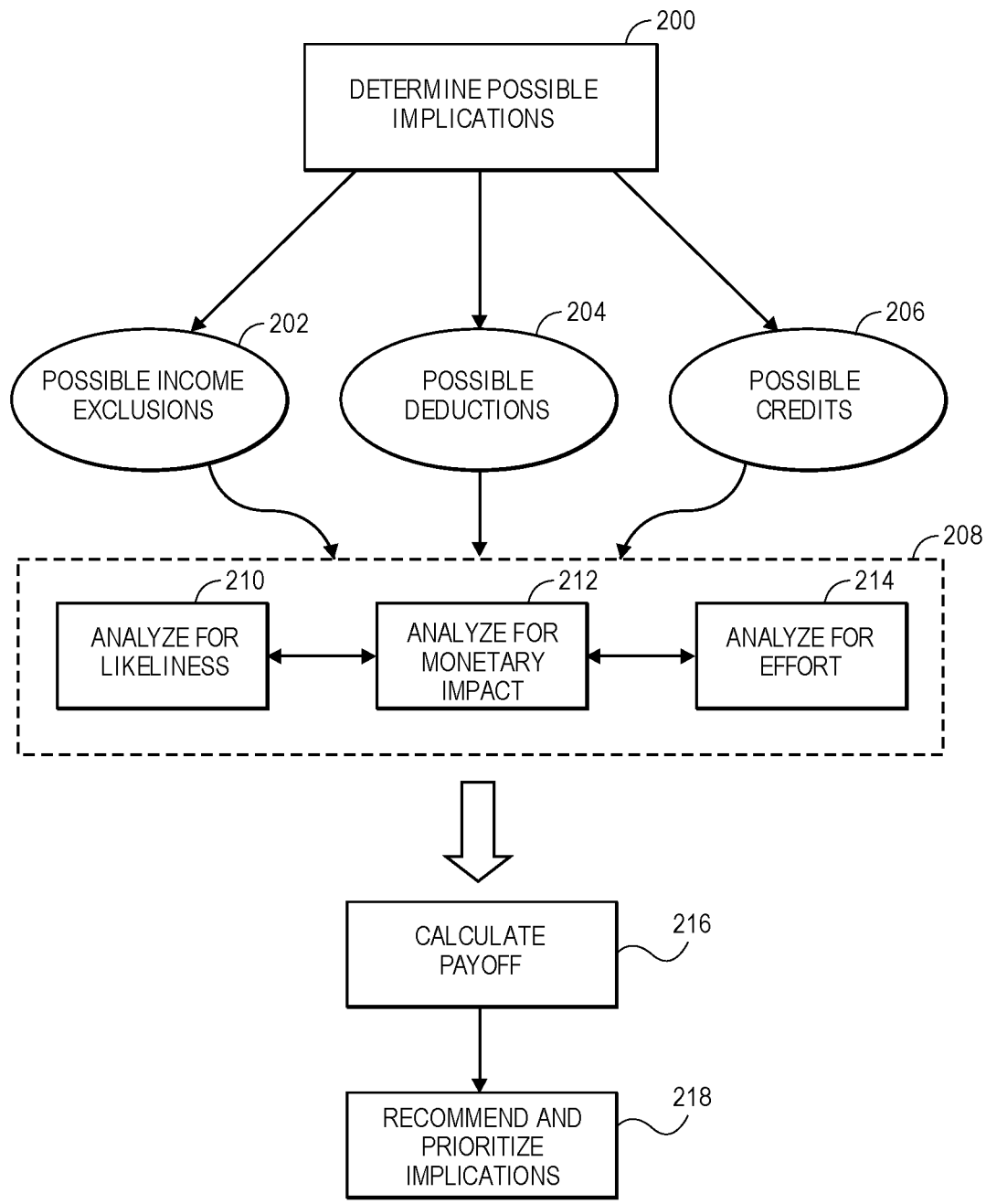
FIG. 2 is a flow diagram illustrating more detailed steps in identifying implications and calculating payoffs.

Turning to FIG. 2, the determination of payoffs will now be discussed in more detail. In Step 200, the possible implications are determined. In some embodiments, this is performed by beginning with a master list of all possible implications. As the user answers queries (in Step 104 above) and provides tax documents (in Step 106 above), certain implications are eliminated from the master list as not applicable to the taxpayer. For example, if the user provides an indication that the taxpayer does not own a home, various deductions related to home mortgages may be removed as not being a possible implication that could be claimed by the taxpayer.

In Step 202, possible income sources are identified. As a general rule, tax is due on "all income from whatever source derived, unless excluded by law" 1.61-1(a) of the U.S. Tax Code. Therefore, the taxpayer may reduce their tax burden by claiming various exclusions from all income that are allowed by law. Examples of these exclusions from income include compensation for certain services, certain gross income from business, certain gains from dealings in property, certain interest, certain rents, certain royalties, certain dividends, certain alimony and other spousal maintenance, certain annuities, income from life insurance, pensions, income from discharge of indebtedness, partnership income, income from a decedent, and interest in an estate or trust.

In Step 204, possible deductions are identified. Deductions reduce the amount of taxable income based upon a certain type of expense or expenditure. Deductions may be based upon expenses incurred to produce additional income, for a charitable purpose, losses, and the like. Tax deductions can be classified into those above the line, which are beneficial to the taxpayer regardless of income, and below the line, which are only valuable to the extent that they exceed the standard deduction amount of the taxpayer. Therefore, embodiments of the invention track the monetary value of itemized deductions entered so far as a measure against the appropriate standard deduction. Examples of deductions are presented above.

In Step 206, possible credits are identified. Unlike tax deductions, which reduce the amount of income that is taxed based upon an expense, tax credits reduce the tax that is collected. The amount of the credit is subtracted from the tax the taxpayer owes. Due to the reduction in the tax owed, not just the taxable income, tax credits are more likely to have a high payoff. Some tax credits are non-refundable, meaning the credit is subtracted from the income tax liability up to the amount you owe. Therefore, if the taxpayer is already projected to receive a tax refund, these non-refundable tax credits provide no benefit to the taxpayer. As such, these non-refundable tax credits may be assigned a zero or low payoff.

Based upon the determined possible implications from Step 200 and the specific tax information for the taxpayer from Steps 102-106, various analytical steps are performed on the implications to determine a payoff for the specific taxpayer. In Step 210, the system determines, calculates, or estimates the likeliness that implication will apply to the taxpayer's tax liability. For example, most implications have a set of qualification criteria. The system may analyze the set of tax information to determine the likelihood that the taxpayer qualifies for the implication. In Step 212, the system determines, calculates or estimates the monetary impact of the implication as it does apply to the tax payer. For some tax implications, this monetary impact may be easily and directly calculable. For other tax implications, this monetary impact may be more difficult to directly calculate, such that other tax returns may be analyzed to determine the impact the tax implication has on other taxpayers. In Step 214, the system determines, calculates, or estimates the effort required by the taxpayer to claim the tax implication. This determination may be based upon an analysis of any supporting documentation and supporting informational requirements for that tax implication, the amount of time and effort observed of other taxpayers in claiming the tax implication, and other considerations.

It should be appreciated that, like other steps discussed herein, Steps 210-214 may be performed in a different order than that previously discussed. Steps 210-214 may be performed periodically independently of the other steps. For example, Steps 210-214 may be performed as new tax returns are being filed, created, or the like. This could include being performed daily, hourly, or the like. Steps 210-214 may also be performed on demand, such as upon the user reaching a certain step of the tax return preparation process or upon specific request by the user.

Based upon the above-discussed steps, the system will calculate a payoff for each tax implication. Payoff, as used herein, is a measure of an amount and likelihood of benefit compared to the time and effort required to achieve that benefit. Payoff may be expressed in any of numerous forms. A first exemplary form is a numerical value. The numerical value could be expressed from 0 to +100, such that 0 is totally inapplicable and +100 is fully indicative of a large, likely, and easy benefit (intermediate values being in the range of 0 to +99). For clarity, throughout the remainder of this application the payoff will be discussed using a numerical value from 0 to +100, with a default value (i.e., before any calculations take place) of 0. In yet other embodiments, the numerical value is a summation of factors with no theoretical maximum or theoretical minimum. A second exemplary form is a letter grade, such as an "F" for definitely should not be pursued and an "A" for definitely should be pursued (intermediate values being "B," "C," and "D"— possibly including plusses and minuses). A third exemplary form may be a color system in which red is definitely should not be pursued and green is definitely should be pursued (intermediate values being on the color spectrum between red and green). A fourth exemplary form may be a simple pass/fail designation. The pass/fail designation definitely states whether the system believes the subject tax return to be worthy of the user's efforts or not. In this and other forms, the system may presume that the tax implication is worth pursuing until proven otherwise (or vice versa). A fifth exemplary form may be a threshold illustration. For example, the threshold illustration may be a thermometer or speed gauge indicative of the payoff.

The payoff that is calculated or otherwise determined is then displayed to the user in Step 218. This can include a recommendation to claim certain tax implications and to prioritize those recommended into an order of highest payoff recommended first. Also displayed to the user may be supporting information about the payoff, such as sub-scores for each of the analyzed components of the payoff (such as a sub-score for likeliness to apply, a sub-score of the expected monetary impact, and a sub-score of the expected effort required). For example, the sub-score displayed may state the following "we recommend looking into whether you qualify for a depreciation deduction. Based upon the information we have so far, we believe there is a 40% chance that you will qualify for this deduction, such a deduction (if you do qualify) could save you between $200 and $500, and will take about 10 minutes to determine whether you qualify. Would you like to look into depreciation deductions?"

The system may also provide additional information to the user about the specific tax implications, any known or estimated criteria for the tax implication, how the tax implication can provide a benefit to the taxpayer, and other relevant information to help the taxpayer determine whether and how to pursue the tax implication. The message may also allow the user to indicate that the answers to queries related to the tax implication, such that the user may immediately begin looking further into the tax implication and determining more specifically if the tax implication applies to the taxpayer's situation.

Figure 3:
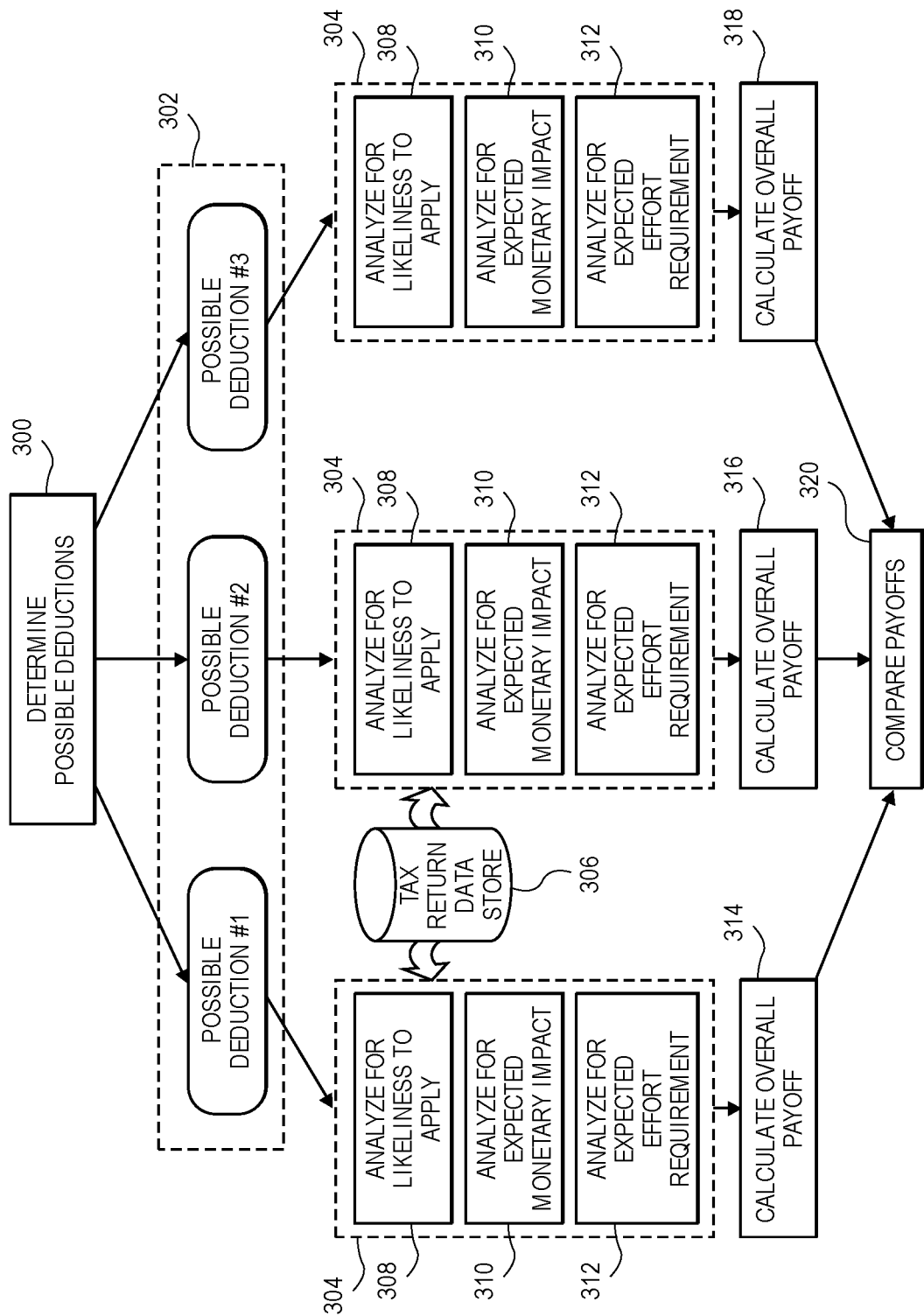
FIG. 3 is a flow diagram illustrating more detailed steps in determining the payoffs associated with various tax deductions.

Turning to FIG. 3, a more detailed description of the calculation of payoffs with respect to tax deductions is shown. It should be appreciated that while the following discussion relates to examples of deductions, similar steps may be used by embodiments of the invention with relation to other tax implications (such as income source exclusions and tax credits). In Step 300, possible deductions are determined, as discussed above. The deductions may then be grouped or otherwise associated with one another, as shown in Step 302. Certain deductions may be related, such that they have similar requirements or are more or less likely based upon the applicability of other deductions.

In Step 304, analyses are performed for each of the possible deductions. These analyses may be based upon the set of tax information received or generated in Step 102, based upon other tax returns filed by the taxpayer in previous years, based upon other tax returns filed by other taxpayers in previous years and/or the current year, based upon recent changes in the law, other known information about the taxpayer (such as subjective information and financial information), and other considerations.

In Step 306, the system accesses a tax return data store. The filed return data store includes a set of comparative information related to at least one other tax return. The filed return data store allows the system to examine trends in the claiming of various deductions by analyzing the set of comparative information. This can include how many people claimed the deduction, how much amount of money the average claim was, how long the user spent preparing the claim. The filed return data store may therefore include information related to stored tax returns, information gathered about the user using the system, historical information, trend information, and other information that may assist embodiments of the invention in performing the calculations discussed below.

In embodiments of the invention, the tax return data store may be located in a location associated with the tax professional, financial professional, the taxing authority, or other location such that it can be accessed. The tax return data store may be periodically or occasionally updated as new information and analyses become available or are performed. The tax return data store may remove or not accept private information so as to not violate privacy concerns of the users.

The trends are determined, at least in part, from analyzing other tax returns and the claimed deductions on those tax returns. The various aspects of the deduction are calculated by determining similarly situated individuals that claimed the deduction. The system may also determine the criteria that likely accompany the deduction. For example, if tax returns had an accompanying attempt and failure to utilize the deduction, the system may determine that similar tax returns will likely not apply for the deduction. In contrast, tax returns that did not attempt and fail to utilize the deduction may have nonetheless been eligible and the taxpayer did not claim the deduction. Similarly, tax returns prepared by a tax professional may be more likely to include all possible deductions as opposed to tax returns prepared by an individual taxpayer.

In some embodiments of the invention, in Step 306 a statistical analysis is performed upon the information within the tax return data store. Broadly speaking, the statistical analysis determines correlations and commonalities between tax data items within each data set (e.g., each tax return or the like). For example, it may be the case in one data set that taxpayers who report rental income are highly likely to take an itemized deduction for mortgage interest. As used herein, a "trend" within a data set is any predictive association between two or more tax data items in the data set. The "trend" may be a determined with respect to changes over time, or a pattern or probabilistic associated that is not dependent on time. Alternatively, the statistical analyzer may determine absolute or conditional take rates for certain deductions within each data set. For example, the employer-backed retirement savings may be present in 25% of the tax returns present. Such single-item trends are also contemplated as being with the scope of the invention.

The statistical analysis may use any statistical techniques, now known or later developed, to identify a set of trends. For example, pairwise correlations may be calculated across all tax data items in a set of tax returns. In some embodiments, multiple regressions may also be used to identify correlated triples or n-tuples. In other embodiments, neural-network based techniques such as Restricted Boltzmann Machines can be used to identify trends within the sets of tax returns.

In still other embodiments, matrix-based techniques such as SVD++ can be used to identify trends. One of skill in the art will appreciate that there are a variety of other statistical and machine-learning techniques that can be used to determine sets of trends. However, in some instances a set of trends within a data set may not be used to identify errors within that data set, because the errors may be present in the data set. As such, machine learning techniques may identify these errors as being normal.

In Step 308, the system determines a likelihood of qualification based upon the various criteria. The likelihood of qualification for the estimated criteria may be an expression of the likelihood that the taxpayer meets the criteria and identified trends. The likelihood of qualification may be a binary true/false expression if the information necessary to determine qualification is definitively known and the identified trend has an associated high level of certainty that the taxpayer will qualify for the deduction. For example, if in previous iterations of the steps were determined to correctly predict the likelihood of qualification, future iterations may raise the likelihood of correct prediction.

In Step 310, the system determines an overall likelihood of qualification of the taxpayer for the specific deduction. The overall likelihood may be based upon the likelihood of qualification based upon the definite criteria, the likelihood of qualification based upon the determined trends, or a combination of both. For example, if the likelihood of qualification is above a high threshold or below a low threshold the overall likelihood of qualification may be above the same high threshold or below the same low threshold. If both likelihoods of qualification exist and are non-binary (e.g., they both include a percentage chance), the overall likelihood of qualification may be a pure average or a weighted average of the two respective likelihoods. The weighted averages may include relative certainty that the likelihood is correct, a cumulative effect of the two respective certainties, the outcome of previous iterations for this or other taxpayers, and other considerations in determining an overall likelihood that the taxpayer is eligible for the deduction.

In some embodiments of the invention, in Step 308 the system determines whether the overall likelihood of qualification is about a certain threshold to warrant further consideration and presentation to the user. The threshold may be predetermined based upon that specific deduction, predetermined for all deductions, variable based upon the other criteria considered, variable based upon user preference, or may be determined or variable based upon other criteria. The threshold is the degree of certainty over which the system is sure enough that the taxpayer may be eligible for the deduction so as to warrant presenting the deduction to the user as either a current or future deduction for the user's consideration.

In Step 310, the system analyzes for an expected monetary impact by the deduction if it does apply. This analysis may be performed, at least in part, by analyzing trends in the tax return data store for other similar taxpayers. Similar taxpayers may be taxpayers in a similar occupational field, with a similar income level, in a similar geographic area, with a similar family demographic, or have other similarities that may be indicative of qualification for the deduction. The analysis may also be performed based at least in part on requirements, caps, or floors associated with the deduction that are set by law, regulation, ruling, or other origin. The analysis may also be performed, at least in part, by analyzing trends in the historical tax returns for the same taxpayer. The analysis may also compare the historical tax returns of the same taxpayer against the information provided thus far to the system. For example, if the analysis notes a change in address, the system may determine that the user has a higher likelihood to qualify for a moving expenses deduction.

In Step 312, the system analyzes for an expected effort required to determine if the deduction does apply. The expected effort may be based at least in part on observed behaviors of other users in claiming the deduction (such as active time spent of certain pages, passive time spent on certain pages, amount of information entered into the system, and other considerations). The expected effort may also be based upon observations of the user in interacting with the system to that point (such as typing speed, active time spent of pages, passive time spent on pages, time spent looking up additional information, and other considerations). The expected effort may also be based upon substantiation requirements for the specific deduction. For example, some deductions require the submission of supporting documentation while other deductions have no such requirements.

Some deductions allow for a high-effort claim and a low-effort claim. For example, items given to charity may be claimed as a general value or as a specific listing of all items with a corresponding value for each. This high-effort claim will allow the taxpayer to deduct more monetary impact but requires additional effort (and in some instances, additional record keeping). Information related to the high-effort claim and the low-effort claim may be presented to the user as options to claim the deduction. For example, "tell us generally about your charitable donation which we expect to take about 3 minutes, or give us a detailed description of your charitable which we expect to take 10 minutes but you should be able to save more money on your taxes."

In Step 314, Step 316, and Step 318, the payoffs are calculated for each of the individual deductions. The payoff may be calculated, determined, estimated to give the user an idea of an overall value in pursuing the deduction. The payoff may be expressed in any of the forms discussed above. The expressed forms may be based upon a mathematical calculation, an overall trend observed, or some combination thereof.

In Step 320, the payoffs of each deduction are compared. The payoffs may then be adjusted or weighted based upon other payoffs. For example, an analysis of all payoffs may provide a likelihood that the taxpayer can overcome a standard deduction. If the individual itemized deductions are likely to overcome the standard deductions, this may result in a higher payoff. The payoff may also rise based upon other deductions that are successfully claimed. As the taxpayer nears the standard deduction, additional itemized deductions will have a noticeable monetary impact. Also, some deductions may be more likely to apply based upon other deductions also applying. This may be determined by analyzing trends in which deductions are typically claimed together.

As discussed above, it should be appreciated that the above discussion is directed to tax deductions may also apply to tax credits, tax income exclusions, and other tax implications. The discussion as to tax deductions was presented to provide a clear exemplary embodiment to the user.

Figure 4:
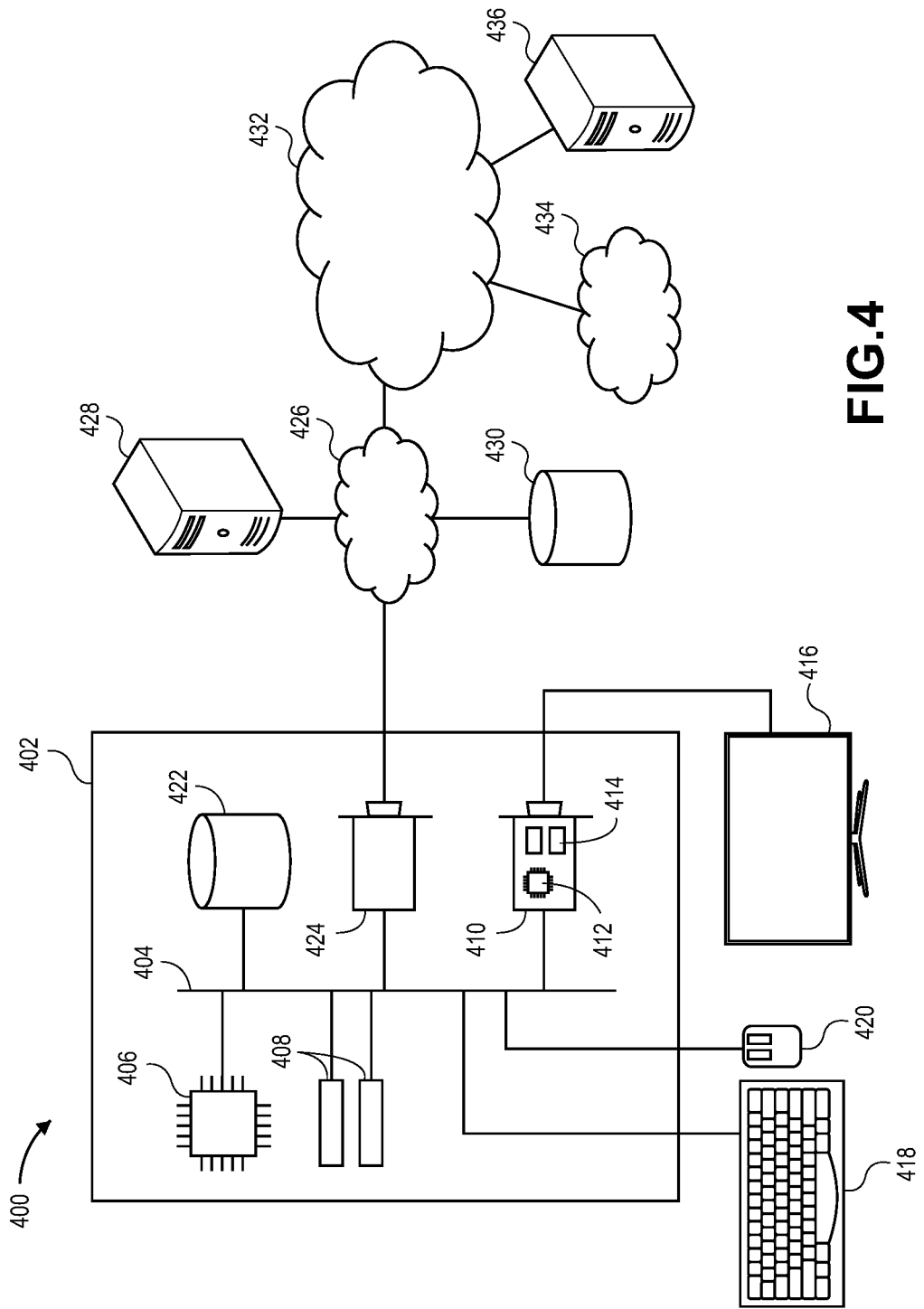
FIG. 4 is a system diagram of an embodiment of the invention depicting various computing devices and their components.

Turning to FIG. 4, the specific components of the system will now be discussed. An exemplary hardware platform 400 for certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 432. Local network 426 is in turn connected to Internet 432, which connects many networks such as local network 426, remote network 434 or directly attached computers such as computer 436. In some embodiments, computer 402 can itself be directly connected to Internet 432.

The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the taxpayer may be provided with a taxpayer account that permits the taxpayer to access embodiments of the invention that are applicable to preparing a tax return. Additionally, the tax preparer may be provided with a tax preparer account. In addition, any number and/or any specific types of account are provided to carry out the functions, features, and/or implementations of the invention. Upon the taxpayer and/or tax preparer logging in to the electronic resource for a first time, they may be required to provide various pieces of identification information to create their respective accounts. Such identification information may include, for instance, personal name, business name, email address, phone number, or the like. Upon providing the identification information, the taxpayer, external entity, and/or tax preparer may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, performs a method of determining and presenting a potential tax implication to a taxpayer, the method comprising the steps of:
obtaining a set of tax data related to the taxpayer;
determining the potential tax implication for the taxpayer based at least in part on the set of tax data;
determining that the potential tax implication requires no additional documentation beyond the set of tax data related to the taxpayer;
accessing historical data from a tax return data store, wherein the tax return data store stores only data associated with tax return implications and statistics and does not store user identification data to retain anonymity for users;
determining an estimated amount of time to complete the potential tax implication by analyzing the historical data and determining an average amount of time to complete the potential tax implication by other users;
determining an estimated monetary impact of the potential tax implication;
selecting the potential tax implication to present to the taxpayer based on the no additional documentation required, the estimated amount of time required to complete the potential tax implication, and the estimated monetary impact of the potential tax implication;
presenting, by a user interface, the potential tax implication to the taxpayer prior to completing tax documents for a current tax period,
wherein the potential tax implication is a first tax implication,
determining a plurality of potential tax implications;
comparing the plurality of potential tax implications;
organizing the plurality of potential tax implications into a ranked order based at least in part on a ratio of the estimated monetary impact to the estimated amount of time to complete; and
presenting the plurality of potential tax implications in the ranked order.

2. The media of claim 1, wherein the computer-executable instructions are further executed to perform the step of presenting, by the user interface, the estimated amount of time to complete the potential tax implication and the estimated monetary impact of the potential tax implication.

3. The media of claim 1, wherein the computer-executable instructions are further executed to perform the steps of:
presenting to the taxpayer a second tax implication of the plurality of potential tax implications;
comparing the first tax implication and the second tax implication; and
providing a recommendation to complete the second tax implication rather than the first tax implication based on the comparison of the first tax implication with the second tax implication.

4. The media of claim 1, wherein the potential tax implication is either a tax deduction or a tax credit.

5. The media of claim 1, wherein the user interface is provided to the taxpayer as a self-preparation tax return service.

6. The media of claim 1, wherein the estimated monetary impact is determined by comparing taxpayer attributes of the taxpayer with attributes of the other users that have completed the potential tax implication.

7. The media of claim 1, wherein the determination of potential tax implications is determined periodically based on a volume of newly filed tax documents.

8. A method of determining and presenting a potential tax implication to a taxpayer, the method comprising the steps of:
obtaining a set of tax data related to the taxpayer;
determining the potential tax implication for the taxpayer based at least in part on the set of tax data;

determining that the potential tax implication requires no additional documentation beyond the set of tax data related to the taxpayer;

determining an estimated amount of time to complete the potential tax implication by:
  accessing historical data from a tax return data store, wherein the tax return data store stores only data associated with tax return implications and statistics and does not store user identification data to retain anonymity for users;
  analyzing the historical data and determining an average amount of time to complete the potential tax implication by other users; and
  analyzing a history of trends in the historical data of the taxpayer;

determining an estimated monetary impact of the potential tax implication;

selecting the potential tax implication to present to the taxpayer based on the no additional documentation required, the estimated amount of time required to complete the potential tax implication, and the estimated monetary impact of the potential tax implication;

presenting, by a user interface, the potential tax implication to the taxpayer prior to completing tax documents for a current tax period, wherein the potential tax implication is a first tax implication, determining a plurality of potential tax implications;

comparing the plurality of potential tax implications;

organizing the plurality of potential tax implications into a ranked order based at least in part on a ratio of the estimated monetary impact to the estimated amount of time to complete; and presenting the plurality of potential tax implications in the ranked order.

9. The method of claim 8, further comprising the steps of:
  presenting to the taxpayer a second tax implication of the plurality of potential tax implications;
  comparing the first tax implication and the second tax implication; and
  providing a recommendation to complete the second tax implication rather than the first tax implication based on the comparison of the first tax implication with the second tax implication.

10. The method of claim 8, wherein the potential tax implication is either a tax deduction or a tax credit.

11. The method of claim 8, wherein the user interface is provided to the taxpayer as a self-preparation tax return service.

12. The method of claim 8, wherein the estimated monetary impact is determined by comparing taxpayer attributes of the taxpayer with attributes of the other users that have completed the potential tax implication.

13. A method of determining and presenting a potential tax implication to a taxpayer, the method comprising the steps of:
  obtaining a set of tax data related to the taxpayer;
  determining the potential tax implication for the taxpayer based at least in part on the set of tax data;
  determining that the potential tax implication requires no additional documentation beyond the set of tax data related to the taxpayer;
  determining an estimated amount of time to complete the potential tax implication by:
    accessing historical data from a tax return data store, wherein the tax return data store stores only data associated with tax return implications and statistics and does not store user identification data to retain anonymity for users;
    analyzing the historical data and determining an average amount of time to complete the potential tax implication by other users; and
    analyzing a history of interactions of the taxpayer;
  determining an estimated monetary impact of the potential tax implication;
  determining at least one other tax implication that is typically completed with the potential tax implication;
  selecting the potential tax implication and the at least one other tax implication to present to the taxpayer based on the no additional documentation required, the estimated amount of time required to complete the potential tax implication, and the estimated monetary impact of the potential tax implication;
  presenting, by a user interface, the potential tax implication and the at least one other tax implication to the taxpayer prior to completing tax documents for a current tax period,
  wherein the potential tax implication is a first tax implication,
  determining a plurality of potential tax implications;
  comparing the plurality of potential tax implications;
  organizing the plurality of potential tax implications into a ranked order based at least in part on a ratio of the estimated monetary impact to the estimated amount of time to complete; and
  presenting the plurality of potential tax implications in the ranked order.

14. The method of claim 13, further comprising the steps of:
  presenting to the taxpayer a second tax implication of the plurality of potential tax implications;
  comparing the first tax implication and the second tax implication; and
  providing a recommendation to complete the second tax implication rather than the first tax implication based on the comparison of the first tax implication with the second tax implication.

15. The method of claim 13, wherein the potential tax implication is either a tax deduction or a tax credit.

16. The method of claim 13, wherein the user interface is provided to the taxpayer as a self-preparation tax return service.

17. The method of claim 13, wherein the estimated monetary impact is determined by comparing taxpayer attributes of the taxpayer with attributes of the other users that have completed the potential tax implication.

* * * * *